United States Patent [19]
Wagner

[11] Patent Number: 5,339,029
[45] Date of Patent: Aug. 16, 1994

[54] METHODS AND APPARATUS FOR MEASURING THE POSTION OF AN EDGE OF A METAL STRIP BY ELECTRONIC INDUCTION

[75] Inventor: Harald Wagner, Kreuztal, Fed. Rep. of Germany

[73] Assignee: Elecktro-Mechanik GmbH, Wenden, Fed. Rep. of Germany

[21] Appl. No.: 929,396

[22] Filed: Aug. 14, 1992

[30] Foreign Application Priority Data

Aug. 14, 1991 [DE] Fed. Rep. of Germany ....... 4126921

[51] Int. Cl.$^5$ .............. G01B 7/00; G01B 7/14
[52] U.S. Cl. ............. 324/207.17; 324/207.12; 324/207.18
[58] Field of Search ........... 324/207.12, 207.17, 324/207.18, 207.24, 206, 239, 242, 243; 340/675

[56] References Cited

U.S. PATENT DOCUMENTS

| | | | |
|---|---|---|---|
| 2,550,736 | 5/1951 | Tricebock | 324/243 |
| 3,205,485 | 9/1965 | Noltingk | 324/207.17 X |
| 3,361,962 | 1/1968 | Albrecht | 324/243 |
| 3,452,343 | 6/1969 | Crank et al. | |
| 4,409,852 | 10/1983 | Suzuki et al. | |
| 4,536,709 | 8/1985 | Ishida | 324/239 |
| 4,752,739 | 6/1988 | Wang | |
| 4,757,259 | 7/1988 | Charpentier | |
| 4,814,734 | 3/1989 | Moran | 324/239 X |

FOREIGN PATENT DOCUMENTS

| | | |
|---|---|---|
| 0098238 | 1/1984 | European Pat. Off. |
| 1964936 | 7/1971 | Fed. Rep. of Germany |
| 3244420 | 6/1984 | Fed. Rep. of Germany |
| 2233596 | 1/1975 | France |
| 0029247 | 3/1977 | Japan ................... 324/239 |
| 92/01956 | 2/1992 | PCT Int'l Appl. |
| 861153 | 2/1961 | United Kingdom |
| 1183974 | 3/1970 | United Kingdom |

*Primary Examiner*—Gerard R. Strecker
*Attorney, Agent, or Firm*—Burns, Doane, Swecker & Mathis

[57] ABSTRACT

In a method for inductively measuring the position of a strip of metal, in which a primary coil fed by an alternating voltage is arranged on one side of a strip edge and a secondary coil is arranged on the other side of the strip edge and a signal reproducing the strip position is derived from the change in coupling at the secondary coil caused by the shielding by the strip, the primary coil is operated at a high frequency of the alternating voltage of at least 10 kHz in order to widen the field of application of the inductive strip position measuring. Non-magnetic coil cores are provided at primary and secondary coil in order to achieve a high natural resonant frequency.

15 Claims, 8 Drawing Sheets

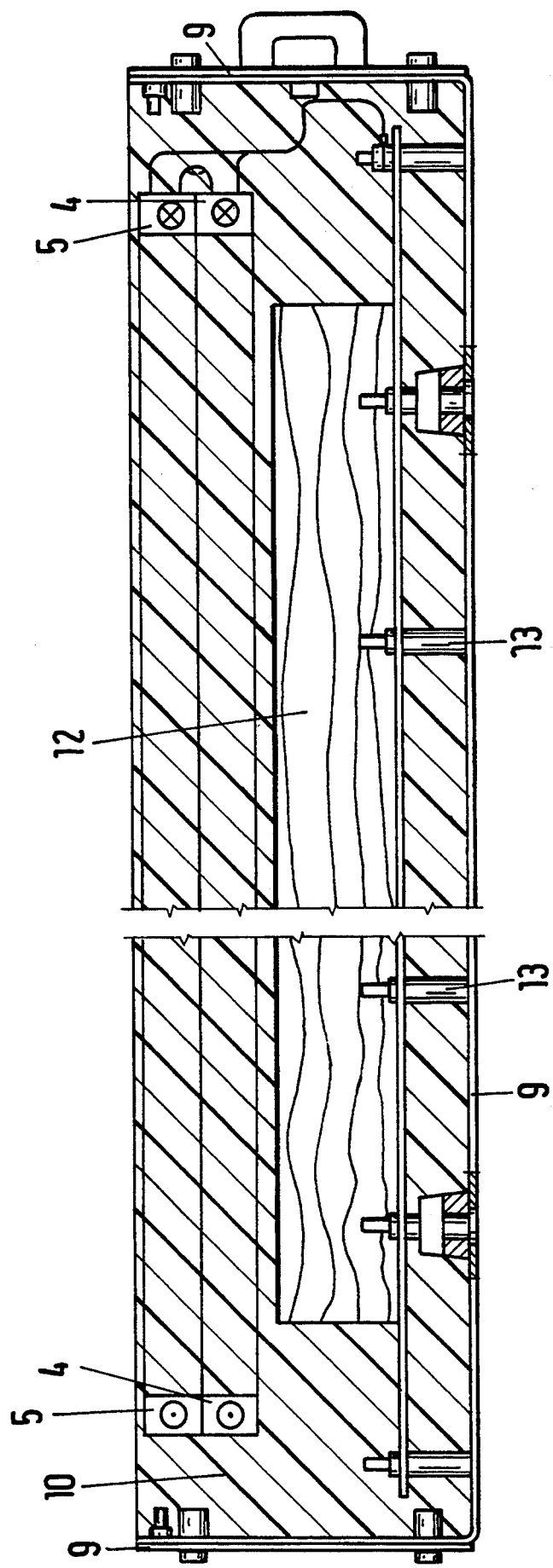

METHODS AND APPARATUS FOR MEASURING THE POSTION OF AN EDGE OF A METAL STRIP BY ELECTRONIC INDUCTION

BACKGROUND OF THE INVENTION

The invention relates to methods and apparatus for measuring the position of an edge of a strip of metal by electronic induction, especially non-magnetic strips of metal.

In spite of the advantages of high insensitivity to material deposits such as scales on the strip and a high degree of freedom from maintenance, the inductive measuring of the position of a strip of metal is used only to a limited extent because thin, non-magnetic strips of metal cannot be measured with the known measuring arrangements given the wide measuring range required.

The invention is based on the object of developing a method and a device of the type initially specified in such a manner that the field of application of the inductive strip position measuring is widened and reliable measuring values are also obtained, particularly, on thin, non-magnetic strips of metal.

SUMMARY OF THE INVENTION

The present invention involves positioning an edge of a metal strip in a space defined by opposing primary and secondary coils. Each of the primary and secondary coils is of elongated shape and surrounds an inner area which defines a lengthwise axis and a widthwise axis, the latter being shorter than the lengthwise axis. The lengthwise axis is longer than the measuring range in which the edge of the metal strip is to be measured. The area is free of a metallic core, i.e., the area contains no core or the core is formed of a non-metallic material.

The edge of the metal strip is positioned within the space so as to be oriented perpendicular to the lengthwise axes when viewed in a direction perpendicular to the metal strip. An exciter circuit is connected to the primary coil for feeding alternating voltage thereto at a frequency of at least 10 KHz. A detector circuit is connected to the secondary coil for determining a voltage induced in the secondary coil by the primary coil. At least one of the primary and secondary coils is operated generally in its resonant frequency. At least that one coil is shielded by a shield of magnetically conductive material which is disposed at a distance from the coil and which surrounds all sides thereof except a side facing the metal strip.

Due to the high operating frequency of, for example, approximately 40 kHz, a strong measuring effect. is achieved by means of which thin, non-magnetic strips of metal can also be reliably measured. In addition, the high operating frequency results in an improvement of the measuring effect when measuring the position of high-temperature strips of metal so that inductive position measuring can also be used in the area of annealing furnaces and the like.

Providing non-magnetic coil cores and coils wound in a special manner results in the coils having a low capacitance so that the coils have a high natural resonant frequency and can be operated at a high operating frequency.

Further advantageous developments of the invention are specified in the following description.

DETAILED DESCRIPTION OF THE DRAWINGS

In the text which follows, illustrative embodiments of the invention are explained in greater detail with reference to the drawing, in which:

FIG. 1b is a side elevational view of the arrangement depicted in FIG. 1a;

FIG. 2b is a sectional view through the coil along line A—A in FIG. 2a, and

FIG. 3 shows a longitudinal section through a housing surrounding a coil,

Figure 4:
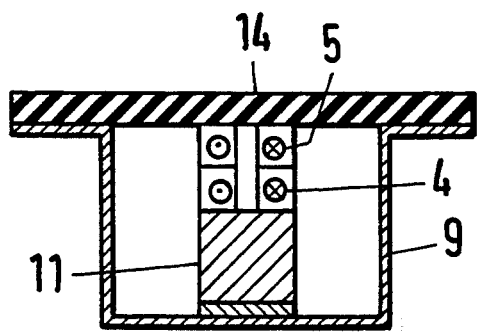
FIG. 4 shows a diagrammatic cross-sectional view of the housing for a coil.
Figure 5A:
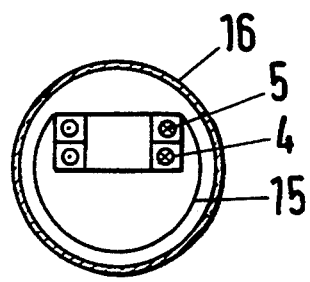
Figure 5B:
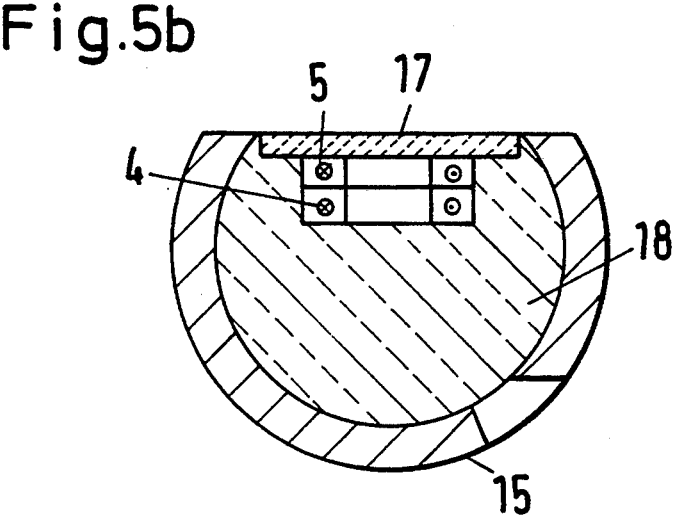
Figure 6:
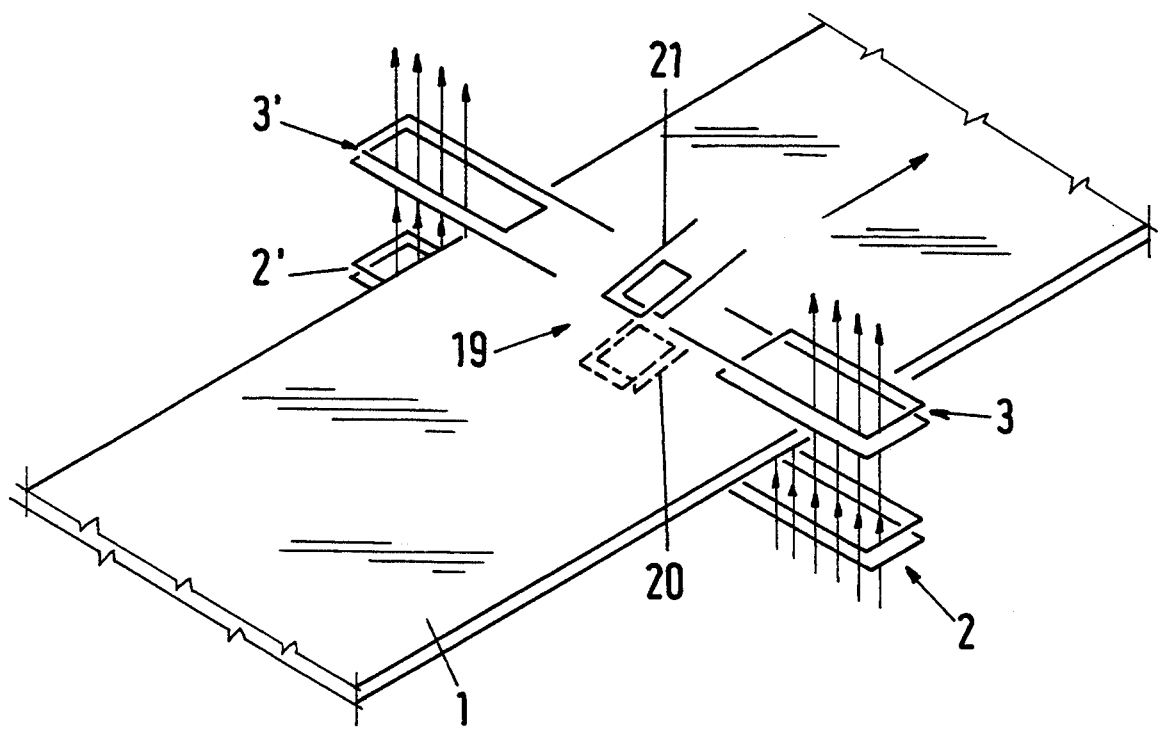
Figure 7:
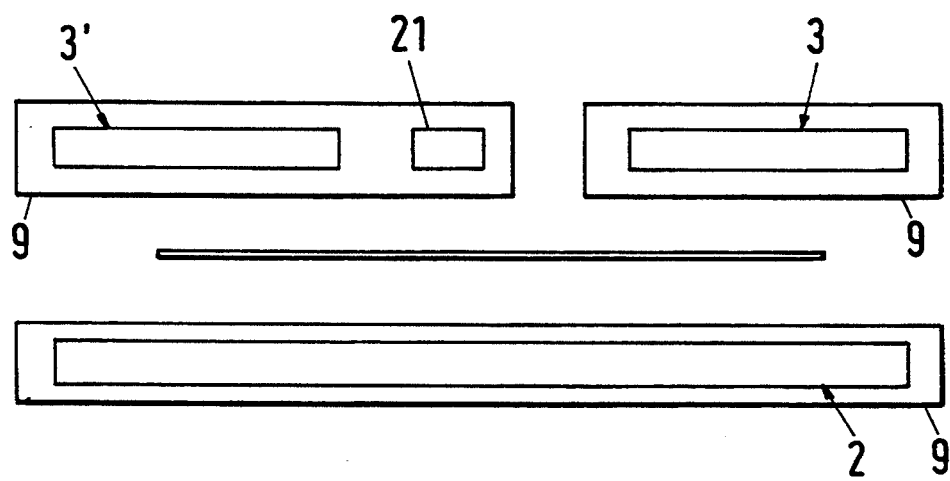
Figure 8:
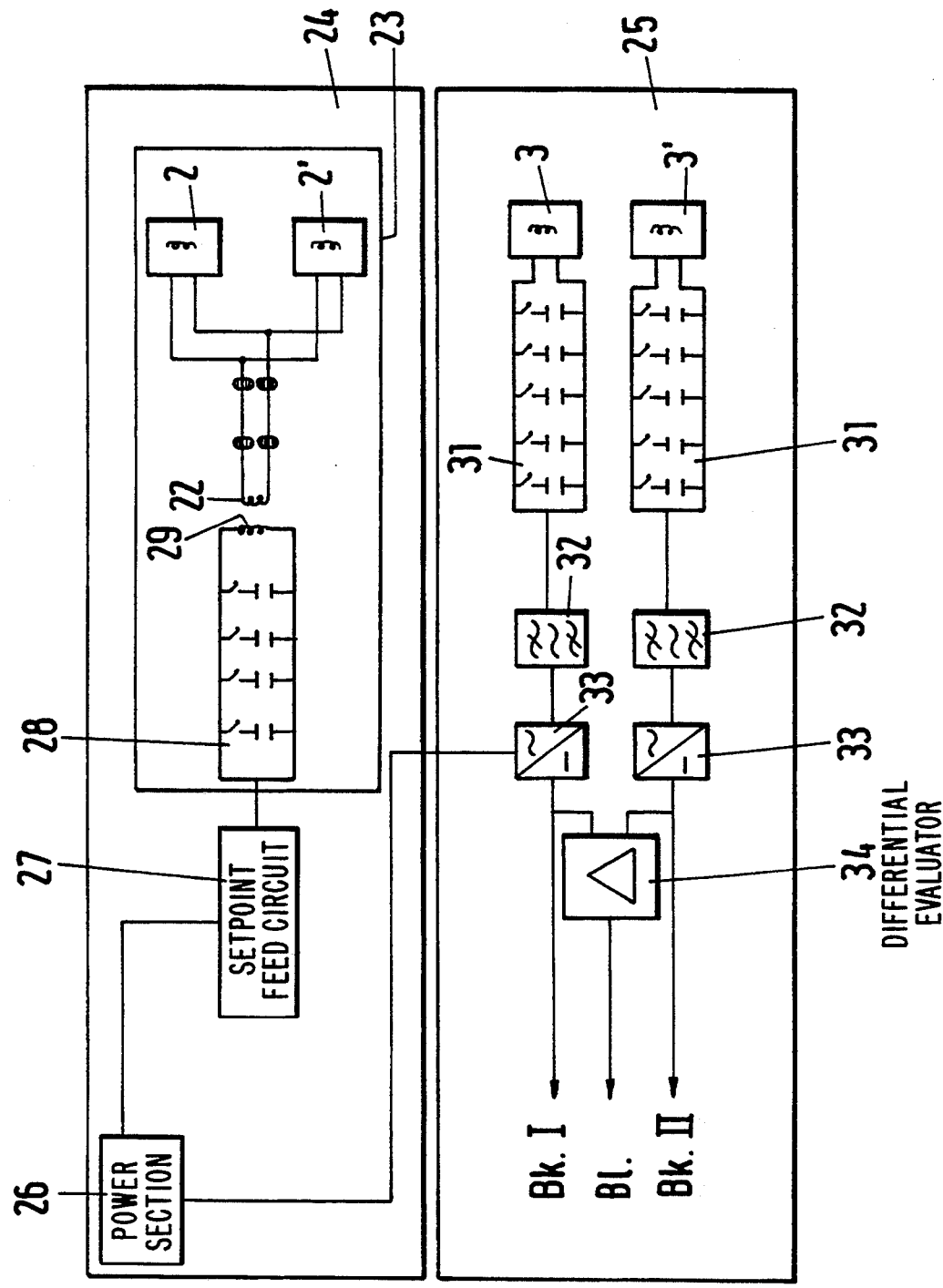
Figure 9:
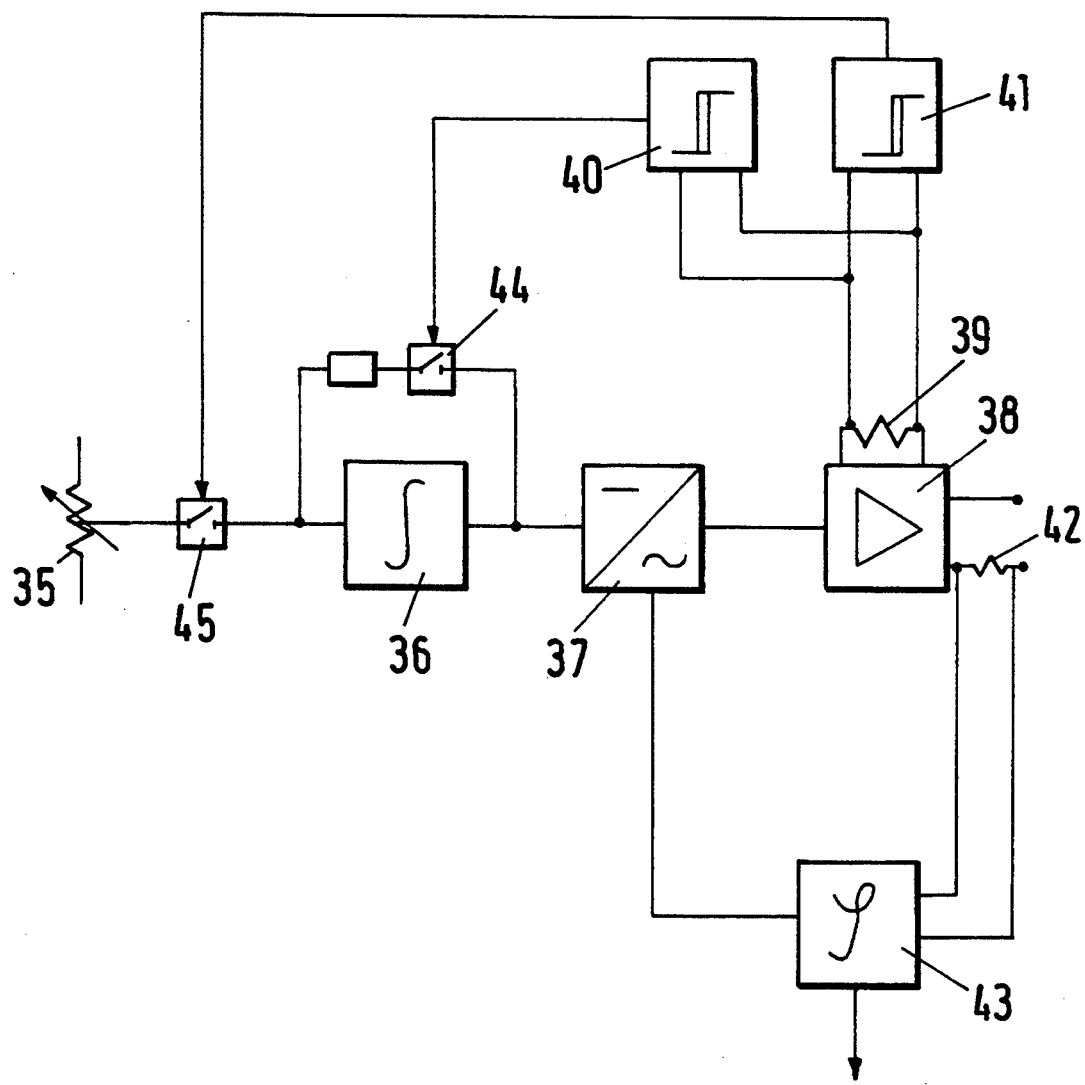
Figure 10:
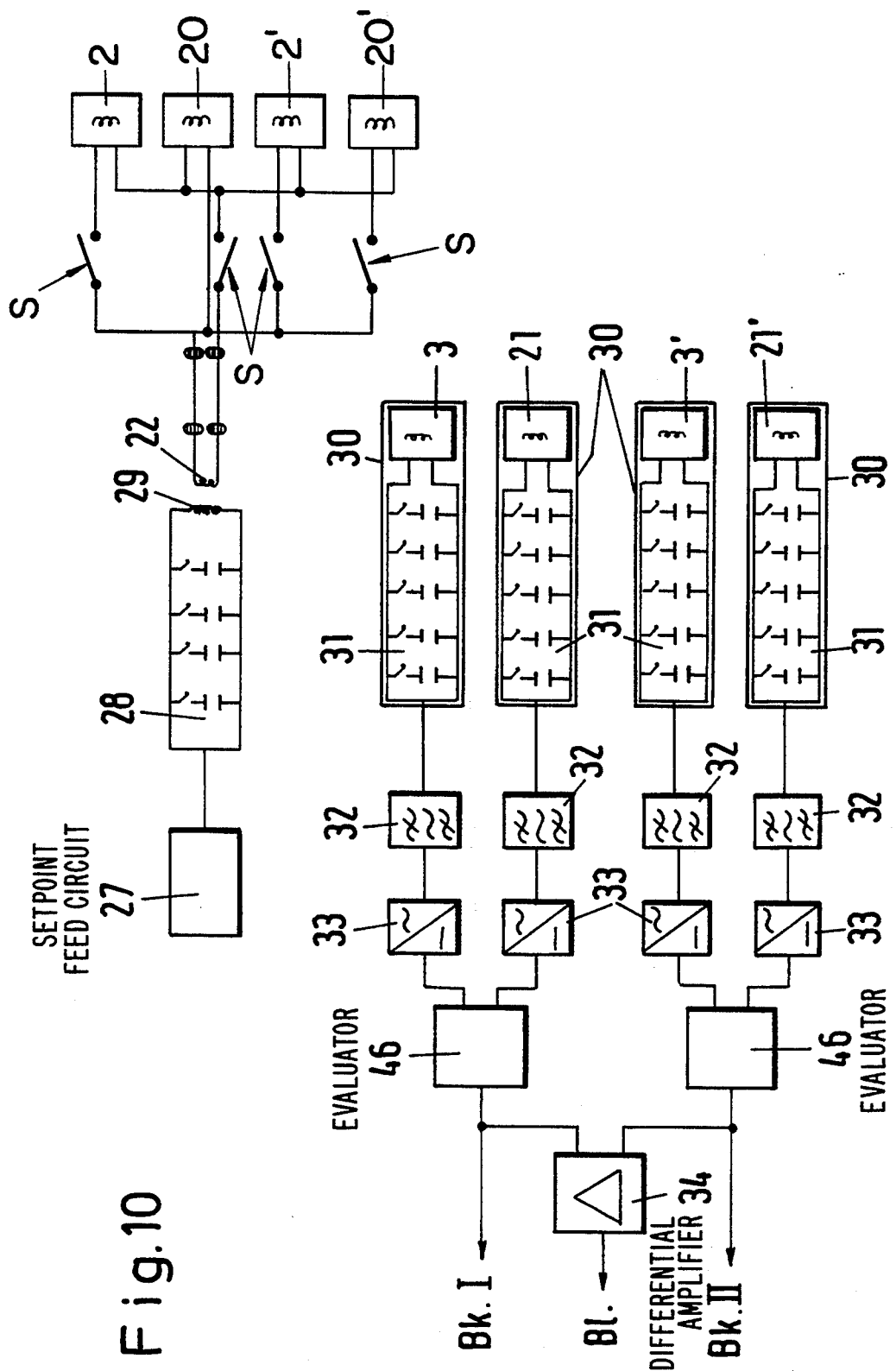

FIGS. 5a and 5b show other developments of the structure surrounding a coil in a cross-sectional view corresponding to FIG. 4, FIG. 6 shows a perspective representation of the measuring arrangement with a reference sensor, FIG. 7 diagrammatically shows a modified arrangement of primary, secondary and reference coils, FIG. 8 shows a block diagram of the measuring arrangement, FIG. 9 shows a circuit diagram for the safety circuit, and FIG. 10 shows a block diagram with reference sensor.

BRIEF DESCRIPTION OF PREFERRED EMBODIMENTS OF THE INVENTION

Figure 1B:
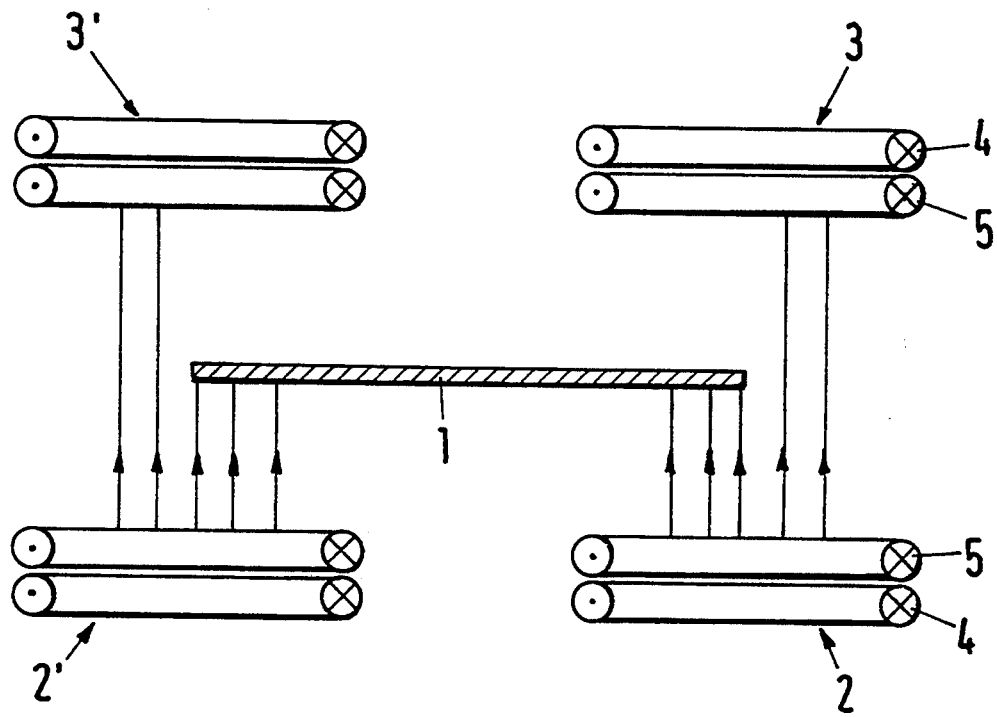
Figure 1A:
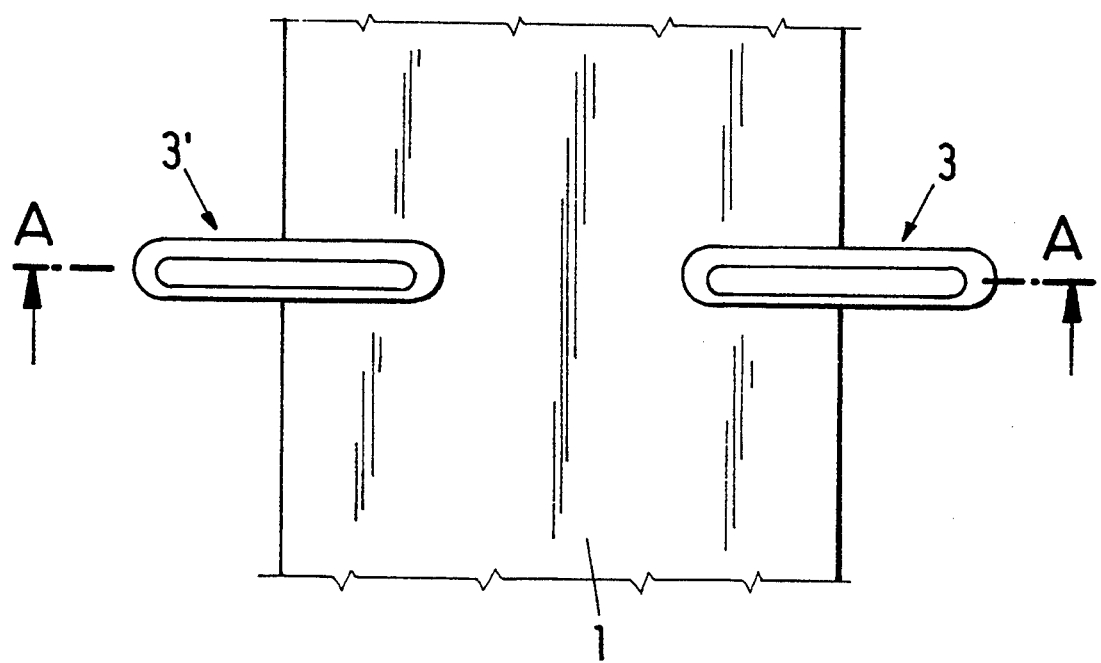
FIG. 1a is a top plan view of an arrangement of a metal strip and two inductive coils.

The arrangement represented diagrammatically in FIG. 1 is intended for measuring the centre position of a strip of metal 1 and exhibits at both strip edges in each case a primary coil 2, 2' located underneath the strip edge in this illustrative embodiment and a secondary coil 3, 3' arranged above the strip edge, lying opposite to the primary coil in the manner of a coreless transformer. Each coil defines a lengthwise axis L and a widthwise axis W (see FIG. 2a). The coils are wound approximately in the shape of an elongated rectangle and are arranged symmetrically to the strip centre with their longitudinal axis transverse to the strip edge at an angle of 9020 . The primary coils 2, 2' are operated at a high operating frequency of at least 10 kHz, for example around 40 kHz. The primary and/or secondary coils can in each case be operated in resonance circuits in the vicinity of their resonant frequency to amplify the measuring effect. The operating frequency may, for example, also be up to 100 kHz.

FIG. 1b diagrammatically shows the change in the coupling effect between primary and secondary coils by the interposed strip edge, field lines being diagrammatically indicated which are partially shielded by the magnetically or electrically conductive strip. The resultant change in coupling between primary and secondary coil is evaluated as a measure of the strip position. In fact, at a high operating frequency, spherical radiation takes place at every point on the elongated primary coils 2, 2'. The spherical radiation produces a homogeneous electromagnetic field essentially over the length of the coils, which field fails to be homogeneous only at the two coil ends. In order to obtain a field which is homogeneous over the measurement range, the length of the coils is therefore designed to be greater than the length of the measurement range.

The natural resonant frequency of a coil is determined essentially by the capacitance as well as the inductance, a lower capacitance leading to a higher natural resonant frequency. In order to permit operation at resonance, the natural resonant frequency should therefore have the value of the operating frequency (for example 40 kHz), or a higher value.

To provide the coils with a high natural resonant frequency, they exhibit coil cores which are non-magnetic or essentially non-magnetic, in order to reduce the inductance, and are wound in a special manner in order to achieve a low coil capacitance.

In conventional inductive strip position measuring devices, electromagnetic waves penetrating from the outside into the measuring system change the relation between field strength H and the induction B. Using nonmagnetic coil cores results in a linear relation between field strength H and induction B as a result of which the electromagnetic waves penetrating from the outside into the measuring system remain without effect when the alternating amplitudes induced in the secondary coils are evaluated. In the illustrative embodiment shown in FIG. 3, the coil cores consist of epoxy resin which is used as casting compound for the coils.

Figure 2B:
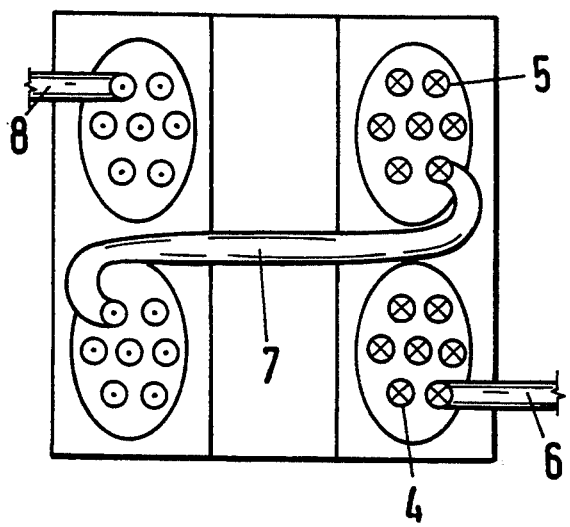
Figure 2A:
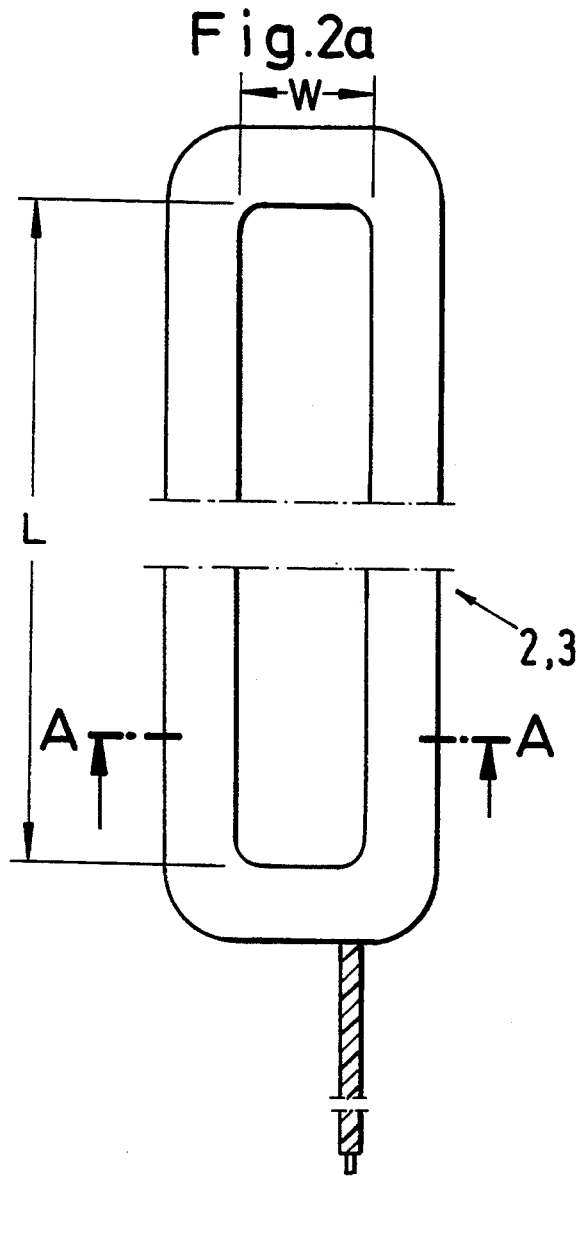
FIG. 2a is a top view of a coil.
Figure 2C:
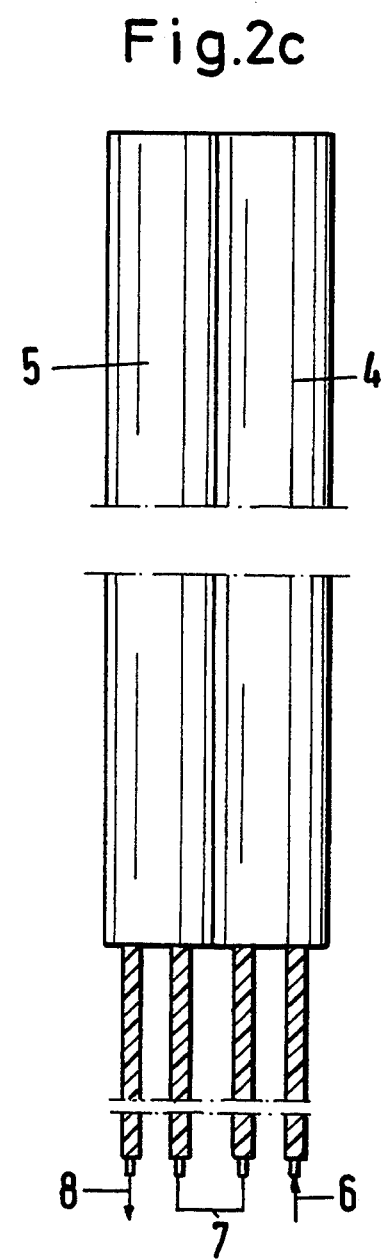
FIG. 2c is a side view of the coil.

In the illustrative embodiment shown, the coil winding 2 or 3 is subdivided into two sections 4 and 5 which are arranged independently of one another and spaced apart one above the other, as is shown in detail in FIG. 2c. As a result of the series connection of the turns in the one section 4 to the turns in the second section 5, a lower capacitance is achieved between the two sections than when all the turns are arranged in a single block or section. An arrangement of all the turns in one block would correspond to a parallel connection of the capacitances, which is higher than in the case of series connection.

In FIG. 2b, the lower section 4 of the coil is provided with an input terminal 6. After a certain number of turns in this section 4, a connection section 7 located outside the winding leads to the upper section 5 of the coil which is preferably provided with the same number of turns as the lower section 4. The output terminal at the upper section 5 of the coil is shown at 8. With a number of turns of, for example, a total of 126 turns/coil (primary coil 2 or secondary coil 3), 63 turns are in each case provided in each section 4, 5.

A further possibility for reducing the capacitance is to increase the distance between the individual turns. This can be achieved by additional or thicker insulation on the electrical conductors of the individual turns or by spacers, for example of ceramic material, between the turns.

On the primary and secondary side, identical coils 2 and 3 are preferably provided, resulting in a symmetrical structure. Primary and secondary coils are also preferably operated in the vicinity of the resonant frequency. However, according to a modified configuration, it is also possible to operate the primary coils in the vicinity of the resonant frequency, while the secondary coils are not operated at the resonant frequency.

FIG. 3 shows in a longitudinal section a housing 9 of metal which is approximately U-shaped in longitudinal and cross-section, in which a coil 2 or 3 with the sections 4 and 5 is arranged. The housing 9 is essentially filled with a casting compound 10, for example epoxy resin, which also sheaths the coil and thus forms the coil core. As is shown in the cross-sectional representation of FIGS. 3 and 4, the coil is arranged at a certain distance from the side walls and the bottom plate of the housing, FIG. 4 only diagrammatically indicating a support 11 for the coil which holds the coil at a certain distance from the bottom plate of the housing whilst the remaining cross-section of the housing is left free, which can also be filled with a different casting compound. In FIG. 3, a filling material is used at 12, which can consist, for example, of wood, to save on casting compound material. At 13, a claw arrangement in the form of clips or the like is indicated by means of which a permanent connection is established between the side walls, the bottom of the housing 9 and the casting compound 10 which protects the coil embedded therein.

The housing 9 (FIG. 4) of magnetically conducting material or, respectively, metal, which surrounds the coil in cross-section at a certain distance in an approximate U-shape is used for narrowing down the measuring field. This shielding of metal electromagnetically short-circuits the areas in which no measuring effects are to occur, so that almost no interfering influences due to moving machine parts located in the vicinity occur.

In FIG. 4, 14 designates an abrasion plate which covers the coil and the housing and consists of magnetically and electrically non-conductive material, for example of plastic such as polyamide. This abrasion plate 14 is used for protecting the measuring arrangement against the mechanical action of a strip of metal to be monitored which is normally arranged at a distance above the abrasion plate 14 in FIG. 4 but can slide on the measuring arrangement under disadvantageous circumstances.

The housing 9, particularly its bottom plate, preferably consists of a stainless steel plate which is reinforced several times and which is used as basic bearing element for the structure and, at the same time, can be used as assembly flange.

FIG. 5a and 5b shows illustrative embodiments of a measuring arrangement, for example for a pickling plant in FIG. 5a or for hot zones, for example for measuring the strip position in an annealing furnace in FIG. 5b. In the cross-sectional view of FIG. 5a, the coil 2 and 3 with the sections 4, 5 is surrounded by a part cross-section of a metal tube 15 on the sides and on the underside, which is used as metal shielding of the coil corresponding to the metal housing 9 of FIG. 4. For this purpose, a cut-open tube is preferably used, in order to obtain a C-shaped cross-section of the shielding or to obtain shielding pointing backwards, the coil being attached in the vicinity of the resultant longitudinal opening. This structure is surrounded by a ceramic tube 16 which can be filled with a casting compound, not shown, the casting compound again forming the coil core. The C-shaped metal shielding 15 can be arranged at a distance from the ceramic tube 16. A metal housing surrounding the ceramic tube 16 can also be provided.

FIG. 5b shows a modified embodiment of a heat-resistant measuring arrangement, in which the C-shaped metal tube 15, which is used as shielding and, at the same time, as carrier for the measuring arrangement, can be covered on the open side by a heat-resistant ceramic plate 17 underneath which the coil 2 and 3 is arranged. The remaining cross-section of the metal tube 15 can be filled by a heat-resistant and heat-insulating compound 18 which, in particular, can consist of ceramic. The ceramic material can here form the magnetically non-conductive coil core. At the same time, the heat-resistant ceramic plate 17 can be used as abrasion plate.

In the embodiment of FIG. 5b, a high-temperature-resistant wire, for example a chromium nickel alloy, which is resistant to heat of up to 1200° C., is used for the coil. The line wire is surrounded by a braiding or weaving of ceramic material or a ceramic fleece or ceramic hose for further heat insulation. Such an embodiment can be used for monitoring the strip position, for example at a strip temperature of about 900° C. A further alternative consists in using appropriately shaped coil formers, for example of ceramic.

In order to support the elongated turns of the coil, a wire mesh or a metal binding on which the turns rest can also be provided in the core region. As a result of such support, which produces an essentially non-magnetic core, there is no interference with the homogeneous field generated by the coil.

The type of winding of the coreless coils as described and the high operating frequency provide a strong measuring effect so that all types of strips of metal can be reliably measured. This also applies to non-magnetic materials such as aluminum, copper, brass or even austenitic chromium-nickel steel with a strip thickness of, for example, 0.1 mm. In addition, it provides a wide measuring range up to approximately 1 m and more when measuring the centre of a strip of metal. Strips of metal are also to be understood as being those strips which are conductive but do not consist of metal such as, for example, strips of electrically conductive plastic.

The measuring arrangement described is used for measuring the centre position of a strip, the difference of the signals determined at the two strip edges being formed and a signal for the centre position being derived therefrom which can be supplied to a control device for the strip run, not shown. The embodiment according to the invention is also of advantage for a single sensor of primary and secondary coil for monitoring a single strip edge.

The measuring arrangement described can also be used for detecting the welding seam on a strip, the welding seam extending transversely to the longitudinal direction of the strip and joining two strips to one another when passing through a strip treatment plant. A section or even a penetration in the strip, which is used for monitoring, is provided in the area of this welding seam, for example in the area of the strip edge. When such a section or such a penetration passes through a sensor of primary and secondary coil, the passage of the welding seam can be detected due to the resultant change in coupling between the primary and secondary coils. The position of the welding seam can be tracked further in the strip treatment plant by including the strip speed. The passage of a welding seam can also be detected with the measuring arrangement for the centre position of the strip shown in FIG. 1 because a distinct change in coupling results from the section or the penetration in the area of the welding seam.

Furthermore, this measuring arrangement can also be used for detecting the strip width by forming the sum of the signals determined at the two strip edges and deriving therefrom a signal for the change in strip width.

The polarity of the coils at one strip edge is advantageously connected to be the reverse of that at the opposite strip edge. In the case of coils which are located closely side-by-side, the region in which no measuring effect occurs is reduced by the opposite polarity. This makes it possible to arrange the secondary coils 3, 3' directly next to one another for detecting the centre position of very narrow strips, so that the coils coils 3, 3' shown in FIG. 1 are located directly next to one another in the horizontal direction. Due to the different polarity of the coils at the opposite strip edges, an unambiguous measuring effect is also obtained with this arrangement. If the secondary coils 3, 3' are arranged closely next to one another, it is also possible to provide only one primary coil 2 covering both secondary coils as is shown in FIG. 7. The secondary coils can also be arranged laterally offset.

A further alternative consists in exchanging primary and secondary coil on one side so that the primary coil is arranged underneath the strip at one strip edge and the primary coil is arranged above the strip at the opposite strip edge.

In order to prevent the secondary coil on the strip side being influenced by the primary coil on the other strip side, the two primary coils can be operated cyclically so that, on the one hand, the coil on one side radiates a field and then, on the other hand, the coil on the other side emits one, only the associated secondary coil being connected for reception in each case.

Due to the high operating frequency, the measuring arrangement also acquires an increased dynamic response in such a manner that the measurement result is obtained more rapidly than at a lower operating frequency.

The strips to be scanned have a different attenuation capability for the electromagnetic field, depending essentially on the material constitution, the strip thickness and strip width and the strip temperature. With respect to the strip position control loop connected to the primary and secondary coils, a low control gradient and hence a larger control error result with decreasing attenuation. In order to prevent gradient differences in the measuring effect, according to a further embodiment of the invention a reference sensor is used by means of which the attenuation capability of the strip can be continuously calculated. The absolute magnitude of the measuring effect can be determined directly by using a reference sensor arranged towards the strip centre. This can be utilised for self-compensation of the entire measuring system by means of an appropriate evaluation. This makes it possible to eliminate the differences in slope of the measuring effect with different strip materials and characteristics. This is particularly appropriate for an application in hot zones, for detection of welding seams and for detecting the position of strip edges.

FIG. 6 shows in a diagrammatic, perspective view a measuring arrangement with a reference sensor 19 which is arranged approximately in the middle of the strip in the illustrative embodiment according to FIG. 6 and exhibits a primary reference coil 20 and a secondary reference coil 21 which is opposite on the other strip side in the manner of a transformer. This reference sensor 19 detects the minimum coupling possible in that the secondary reference coil 21 only senses the part of the magnetic field output by the primary reference coil 20 which has been attenuated by the strip material. The reference sensor is used for compensating for the influence of different material characteristics of the strip 1 and to improve the measuring effect in that the signal obtained from the reference sensor is further processed with the signals obtained from the two strip edge sensors. This is explained in greater detail with reference to the circuit diagram of FIG. 10.

FIG. 7 shows a modified embodiment of the measuring arrangement with reference sensor, a single primary coil 2, which extends beyond the strip width in its longitudinal extent but otherwise exhibits the structure previously described. In the area of the strip edges, the secondary coils 3, 3' are located opposite to the primary coil 2, the reference sensor only being constructed in the form of a secondary reference coil 21 which can be arranged, for example, in the housing 9 of the secondary coil 3'.

Other arrangements of the reference sensor are also possible. Thus, one reference sensor 19 can be provided in each case for each strip edge so that the reference sensor 19 reproduced in FIG. 6 is arranged on each strip side as is shown in FIG. 10. Furthermore, the primary and secondary reference coils 20, 21 can be arranged, for example, in the housing 9 of the coils 2 and 3 in FIG. 6. Similarly, it is possible for the secondary reference coil 21, for example by being inclined to a certain extent in the inner area of the strip 1, to detect the attenuated magnetic field, output by a single primary coil 2 arranged in the strip edge area and propagating from the primary coil around the area of the secondary coil, the secondary reference coil 21 only sensing the part of the magnetic field completely attenuated by the strip material.

The dimensions of the reference sensor can be much smaller than those of the secondary coils 3. As a result, the reference sensor can be easily integrated in the housing of a secondary coil. The primary reference coil 20 can also be integrated in the housing of a primary coil 2.

The reference sensor can also be used for controlling the intensity of radiation of the primary coil. When used in a furnace, measuring the sensor temperature also allows the thermal expansion of the mechanical construction and hence the position of the coils in the furnace, and thus the absolute position of the strip, to be determined precisely.

If the primary coils 2, 2' are operated cyclically alternately, the reference sensor can be interrogated between the cycles.

FIG. 8 diagrammatically shows the structure of an exciter circuit 24 and of a detector circuit 25 with the connected primary coils 2, 2' and secondary coils 3, 3'. The exciter circuit 24 comprises a power section 26 which is also used for supplying the detector circuit 25.

The actual exciter circuit exhibits a setpoint feed circuit 27 with high operating frequency of, for example, 40 kHz and a resonance circuit 23 comprising a capacitor bank 28, resonance coil 29, coil 22 and primary coils 2, 2'. The setpoint feed circuit 27 excites the resonance circuit 23 in the vicinity of its resonant frequency by feeding in an electric oscillation with an amplitude which corresponds to the setpoint. Together with a further coil 22, the resonance coil 29 forms a transformer by means of which the high-frequency alternating voltage is transferred to the primary coils 2, 2' and the circuit of the primary coils 2, 2' is electrically decoupled from the rest of the circuit. The primary coils 2, 2' are in each case connected in parallel with the coil 22. The resonance circuit 23 can be tuned to the length of cable between exciter circuit and primary coils by connectable capacitors 28 and thus compensate for the cable capacitances, the resonance circuit 23 being adjusted to the total inductance of the resonance circuit 23, which is composed of the transformer 29, 22 and the primary coils 2, 2', by the capacitor bank 28 in such a manner that the resonant frequency of the resonance circuit 23 is in the vicinity of the operating frequency, in such a manner that the resonance circuit 23 exhibits inductive behaviour, that is to say the voltage phase leads the current phase. Both the connectable capacitors 28 and the exciter circuit are connected in parallel with the resonance coil 29.

A dedicated resonance circuit can also be allocated to each primary coil, so that alternating operation is also possible. Furthermore, it is also possible to operate the primary and/or secondary coils via a series resonance circuit.

The setpoint feed circuit 27 is shown as a block diagram in FIG. 9. Via a potentiometer 35, a voltage is picked up which is forwarded via a switch 45 to an integrator 36. The integrator 36 is provided with a switch 44 which disconnects it in certain cases. The integrator 36 is followed by a function generator 37 which converts the direct-voltage output signal of the integrator 36 into a sinusoidal alternating voltage which is fed into the resonance circuit 23 via an amplifier 38. The function generator has a constant operating frequency and is built up of temperature-compensated components. Across the resistor 39, a voltage signal is picked up which is proportional to the current fed into the resonance circuit 23 by the amplifier 38, a power output stage. This voltage signal is supplied to two threshold switches 40 and 41 which drive the switches 44 and 45. The threshold switches can be constructed, for example, as Schmitt-triggers. Those switches can be set, for example, in such a manner that the threshold switch 40 switches through the switch 44 from a feed current intensity of 1.3 amperes. Regarding the threshold switch 41, a current intensity of 1 ampere of feed current, for example, is suitable as threshold value for switching off the switch 45.

The exciter circuit 24 forms a sinusoidal radiation of the primary coils 2 which has little distortion (low content of harmonics) in order to achieve a slight active radio interference suppression.

In the detector circuit (see FIG. 10), the secondary coils 3, 3' with the connectable capacitors 31 in each case form a resonance circuit 30. Each resonance circuit 30 is tuned to the line length between detector circuit 25 and secondary coils 3, 3' by the connectable capacitors 31. The received signals are filtered by bandpass filters 32 and amplified by rectifiers 33. At the outputs of the rectifier 33, the signal for the position of the strip edge I and strip edge II, respectively, is present. If these two signals for strip edge I and for strip edge II are subtracted from one another by a differential amplifier 34, a signal for the centre position of the strip or, respectively, for the strip position is obtained.

During alternating operation, the signal is detected in the pulse periods, the signals in the pulse pauses also being made use of for evaluation. A switch for pulsed operation, which is not shown, may be connected in series or in parallel with the resonance circuit.

When the exciter circuit 24 is switched on (see FIG. 10), first the switch 45 is switched on as a result of which a certain voltage is applied to the integrator 36. The output signal of the integrator increases and thus, via the function generator 37 and the amplifier 38, controls the feed current which increases until the output signal of the integrator 36 corresponds to the voltage at the tap of the potentiometer 35. If the first threshold of the threshold switch 41 is reached, for example at 1 ampere, in the case of a switching short circuit the base signal of the integrator 36 is switched off via the switch 45 and the output signal of the integrator remains constant at a level or nominal value which corresponds to the feed current of about, for example, 1 ampere.

In the case of an operating short circuit in the resonance circuit 23, particularly in the feed lines to the primary coils 2, 2', the load at the amplifier 38 abruptly decreases and the feed current correspondingly rapidly increases. With such a feed current increase, the switch 44 is switched on by the threshold switch 40 as a result of which the integrator 36 is switched off and the control signal for the function generator 37 is reduced to approximately 0. When the short circuit is eliminated, the regulator automatically resets itself to the correct value.

By means of the circuit according to FIG. 9, protection against overloading during switching-on and during a short circuit of the primary resonance circuit is achieved without a thermal melting fuse or the like, which would not permit automatic switching on.

Furthermore, a phase decoder 43 compares a signal, which is picked up across the resistor 42 in the resonance circuit 23 and reproduces the phase of the current in the resonance circuit 23, with a signal of the function generator 37, which signal corresponds to the phase of the input voltage in the resonance circuit 23. When disturbances occur in the form of interruptions in the feed lines to the primary coils 2, 2', the phase relationship in the resonance circuit changes from the current phase lagging to the current phase leading with respect to the voltage phase. When a change in the phase relationship is detected, an alarm is output by the phase decoder 43. The resonance circuits of the secondary coils can be monitored in a similar manner.

FIG. 10 shows a circuit structure with reference sensors which exhibit two primary reference coils 20 and 20' and two secondary reference coils 21 and 21'. The exciter circuit essentially corresponds to that of FIG. 8, but now two primary coils 2 and 2' and two primary reference coils 20 and 20' are in each case connected in parallel with the coil 22, the primary coils 2 and 2' being provided for the measurement signal and the primary reference coils 20 and 20' being provided for the reference signal. The corresponding two secondary coils 3 and 3' and the two secondary reference coils 21 and 21' are in each case located in their own resonance circuit 30, as in the structure of FIG. 8, being followed in each case by a bandpass filter 32, a normalising amplifier, not shown, a rectifier 33 and a smoothing element, not shown. Each secondary coil is in each case associated with a secondary reference coil, the in each case two signals being evaluated by evaluating electronics 46 in accordance with the following formula:

$$MES_{KORR} = (MES - REF) REF_{MAX} / (REF_{MAX} - REF)$$

where $MES_{KORR}$ is the corrected measured value of the strip edge, MES is the uncorrected measured value from the coil 3 and 3' of the strip edge at the output of the rectifier 33, REF is the reference value, determined by the coil 30 and 30' at the output of the rectifier 33, and $REF_{MAX}$ is the maximum reference value present when there is no strip between primary and secondary reference coil. The strip position is obtained from the difference and the strip width from the sum of the corrected measured values ($MES_{KORR}$) of the two strip edges. This evaluation corresponds to self compensation of the entire system, as a result of which differences in slope of the measured values (MES) are compensated and the electrical measuring range is adapted to the strip material and is spread open in accordance with the value of $REF_{MAX}$. In addition to this electronic evaluation, an electronic linearisation of the measured values is possible. One and the same reference value can also be used for evaluating the measured values of the two strip edges.

A further possibility for testing the operability of the coils is to allow an impressed DC or AC current to flow through them. The current signals and voltage signals are evaluated for this purpose. The current impression can take place during the operating state or even in pulse pauses. A defect is detected by the difference between the predetermined impressed current and that which is found.

The secondary coils can be monitored in a simple manner for their operability by checking the signals MES or REF or $MES_{KORR}$ by means of threshold switches which output an alarm below specific threshold values.

A dual threshold switch, at the input of which the signal for the strip position is present, can also be used for detecting a strip oblique position or strip displacement when the threshold values are correspondingly dropped below or exceed.

The output signals for the strip position are post-amplified by amplifiers, not shown, it being possible to select an amplifier of at least two amplifiers with different gain factors being able to be in dependence on the material or on the geometry and the resultant different measuring effects.

I claim:

1. An arrangement comprising a metal strip having an edge, and an apparatus for inductively measuring the position of said edge within a measuring range lying in a plane of said strip, said apparatus comprising:

primary and secondary coils of elongated shape, each surrounding an inner area which defines a lengthwise axis and a widthwise axis, said widthwise axis being shorter than said lengthwise axis, said lengthwise axis being longer than said measuring range, said area being free of a metallic core, said primary and secondary coils being disposed opposite one another to define a space therebetween in which said edge of said strip is disposed and being oriented perpendicular to said lengthwise axis when viewed in a direction perpendicular to said metal strip;

an exciter circuit connected to said primary coil for feeding alternating voltage thereto at a frequency of at least 10 KHz;

a detector circuit connected to said secondary coil for determining a voltage induced in said secondary coil by said primary coil;

at least one of said primary and secondary coils being operated generally in its resonant frequency; and a shield of magnetically conductive material disposed at a distance from said at least one coil and surrounding all sides thereof, except a side thereof facing the metal strip.

2. An arrangement according to claim 1, wherein said strip includes a second edge, and further including a second said apparatus for measuring the position of said second edge.

3. An arrangement according to claim 2, wherein a polarity of said primary and secondary coils disposed at one of said edges is opposite to a polarity of said primary and second coils disposed at the other of said edges.

4. An arrangement according to claim 2, wherein said strip includes opposite first and second sides, each side extending between said edges, said primary coil disposed at one of said edges facing said first side, and said primary coil disposed at the other of said edges facing said second side.

5. An arrangement according to claim 1 including a non-metallic core disposed in said area.

6. An arrangement according to claim 1 wherein said area is coreless.

7. An arrangement according to claim 1 wherein said strip includes a second edge, said lengthwise axis of said primary coil being greater than a distance between said edges of said strip, said primary coil being arranged to extend beyond both of said strip edges, said apparatus further including a second secondary coil disposed opposite said primary coil to define a second space in which said second edge is disposed, said second secondary coil surrounding an inner area which is free of a metallic core and defining lengthwise and widthwise axes, said widthwise axis of said second secondary coil being shorter than said lengthwise axis thereof, said lengthwise axis of said second secondary coil being longer than said measuring range for said second edge, and said second secondary coil being connected to a detector circuit.

8. An arrangement according to claim 1, wherein said strip includes two edges and opposite first and second sides extending between said edges, said apparatus further including reference sensing means for measuring a capacity of said strip for attenuating a magnetic field produced by said primary coil, said reference sensing means comprising a primary reference coil facing said first side near a center of said strip, and a secondary reference coil facing said second side at a location opposing said primary reference coil.

9. An arrangement according to claim 1, wherein said strip includes a second edge, and opposite first and second sides extending between said strip edges, said apparatus further including reference sensing means for measuring a capacity of said strip for attenuating a magnetic field produced by said primary coil, said reference sensing means comprising a primary reference coil disposed adjacent said first side of said strip between said strip edges, and a secondary reference coil disposed adjacent said second side of said strip between said strip edges and opposing said primary reference coil, said primary reference coil being connected to an exciter circuit, and said secondary reference coil being connected to a detector circuit.

10. An arrangement according to claim 9, wherein said primary reference coil is connected to the same exciter circuit to which said primary coil is connected, said exciter circuit constituting means for actuating said primary coil cyclically and for actuating said primary reference coil in between the actuation cycles of said primary coil.

11. An arrangement according to claim 1, wherein each of said primary and secondary coils is subdivided into at least two sections which lie above and below one another and which are interconnected in series.

12. An arrangement according to claim 1, wherein said shield has a C-shaped cross-section.

13. A method of measuring an edge of metal strip within a measuring range lying in a plane of said strip, comprising the steps of:

providing primary and secondary coils of elongated shape, each surrounding an inner area which defines a lengthwise axis and a widthwise axis, said widthwise axis being shorter than said lengthwise axis, said lengthwise axis being longer than said measuring range, said area being free of a metallic core, said primary and secondary coils being disposed opposite one another to define a space therebetween;

positioning said edge of said metal strip in said space so as to be oriented perpendicular to said lengthwise axes when viewed in a direction perpendicular to said metal strip;

connecting an exciter circuit to said primary coil for feeding alternating voltage thereto at a frequency of at least 10 KHz;

connecting a detector circuit to said secondary coil for determining a voltage induced in said secondary coil by said primary coil;

operating at least one of said primary and secondary coils generally in its resonant frequency; and shielding said at least one coil by a shield of magnetically conductive material disposed at a distance from said at least one coil and surrounding all sides thereof, except a side thereof facing the metal strip.

14. A method according to claim 13, wherein said strip includes a second edge and first and second sides extending between said edges, said method further including the steps of measuring a capacity of said strip for attenuating a magnetic field produced by said primary coil by actuating a primary reference coil disposed adjacent said first side of said strip and between said strip edges for inducing a voltage in a secondary reference coil disposed adjacent said second side of said strip between said strip edges and opposite said primary reference coil, and detecting said induced voltage by a detector circuit connected to said secondary reference coil.

15. A method according to claim 14 further including the steps of actuating said primary coil cyclically, and actuating said primary reference coil in between the actuating cycles of said primary coil.

* * * * *